UNITED STATES PATENT OFFICE.

BENJAMIN T. BROOKS AND FRED W. PADGETT, OF PITTSBURGH, PENNSYLVANIA, ASSIGNORS TO GULF REFINING COMPANY, OF PITTSBURGH, PENNSYLVANIA, A CORPORATION OF TEXAS.

MANUFACTURE OF A NON-VOLATILE UNSATURATED HYDROCARBON FROM PETROLEUM.

1,220,821.  Specification of Letters Patent.  Patented Mar. 27, 1917.

No Drawing.   Application filed August 10, 1914.  Serial No. 855,983.

*To all whom it may concern:*

Be it known that we, BENJAMIN T. BROOKS and FRED W. PADGETT, both citizens of the United States, residing at Pittsburgh, Allegheny county, State of Pennsylvania, have invented certain new and useful Improvements in the Manufacture of a Non-Volatile Unsaturated Hydrocarbon from Petroleum; and we do hereby declare the following to be a full, clear, and exact description of the invention, such as will enable others skilled in the art to which it appertains to make and use the same.

The present invention relates to the production of non-volatile unsaturated hydrocarbons from petroleum oils, that is to say, the production of a hydrocarbon which suffers no appreciable evaporation loss until it sets to a hard film. The product is, for this reason, and on account of the cheapness of its manufacture appropriate as a substitute for linseed oil in paint compounds, and has the further advantage that it is non-saponifiable, so that paints containing it may be applied to surfaces of cement, concrete, and the like, without the deterioration due to the action of the lime present in the concrete and cement material upon the oleaginous ingredient of the paint with the production of a lime soap tending to cause the paint coating to subsequently peel off from the surface to which it has been applied.

In the practice of the invention, we prefer to select as the material from which the product is to be manufactured a petroleum oil of the grade known commercially as "solar" oil, that is to say, an oil of a grade between the more expensive lubricating oils and kerosene. Such an oil may be regarded as a mixture of constituents all of which have a boiling point above approximately 250° C., and is particularly appropriate to the practice of the invention because of its relatively small cost, as compared with the more expensive lubricating oils, and because it is sufficiently non-volatile to enable it to dry, that is to say, to set to a firm film by oxidation by the air, substantially without loss by evaporation.

The first step in the treatment of the petroleum selected is to chlorinate it in accordance with the general formula:—

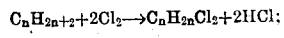

or more specifically—

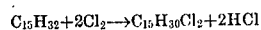

thereby also obtaining hydrochloric acid as a by-product, free from arsenic and sulfur compounds.

The dichlorid thus obtained is then subjected to a high temperature, ranging from 350° C. to 550° C., preferably in the presence of a suitable catalyst such as barium chlorid, BaCl$_2$. The reaction may be represented generally by the following formula:

or more specifically—

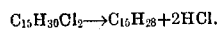

When barium chlorid is employed as the catalyst, it is found that at a temperature of 400° C. a satisfactory yield of the final product (*i. e.*, unsaturated hydrocarbon) both with respect to quality and quantity is obtainable. In both respects, the yield is improved by operating *in vacuo* (say 20 mm.). The yield may be further improved by diluting the oil vapors by an inert gas or vapor, such as nitrogen or steam.

In operation, the dichlorid vapors will be passed over or through the catalyst, as, for instance, through a porcelain tube containing the catalyst and heated to the required temperature. Provision should be made to remove the olefin product as it is produced so that it shall not remain sufficiently long in the heated zone to suffer dissociation. At their exit from the porcelain tube or equivalent treating chamber, the vaporous products are conducted first through a cooling coil for the purpose of condensing out the unsaturated and non-volatile main product, and the hydrochloric acid vapors are recovered in any suitable way, as, for instance, by passing them on into a tower where they are met and absorbed by encountering an appropriate spray of water.

The supply of chlorin to be used for chlorinating the petroleum employed may be readily obtained from any convenient source, as, for instance, from the excess production of the electrolytic cells used in the manufacture of caustic alkali, and the invention thereby supplies a convenient means for recovering the chlorin from such source, in the form of hydrochloric acid, which, as will be noted, is a by-product of both of the steps of the method herein described.

It will be further understood that while the chlorination may be practised with satisfactory results by merely passing the chlorin into the oil, as hereinbefore referred to, other methods of chlorination may be employed; as, for instance, chlorination in the presence of ultra-violet light; chlorination at high temperatures; chlorination *in vacuo;* chlorination carried out by mixing petroleum vapors and chlorin vapors in the dark and then exposing them to ultra-violet light and the like.

The product obtained by the practice of the present invention is one containing double bonds which have been introduced into the petroleum originally treated, by the preliminary chlorination of the oil treated and the splitting off of hydrochloric acid from the chlorinated oil under such conditions as to insure the desired result. The final product is found to have an iodin number varying from say 120 to 150 according to the boiling point of the solar oil and is capable of absorbing oxygen with the formation of a "drying" film, such as is given by linseed oil.

What we claim is:—

1. The method of producing a non-volatile unsaturated hydrocarbon drying oil, which comprises chlorinating a petroleum fraction having a boiling point above about 250° C. to an extent sufficient to form dichlorinated derivatives of hydrocarbons contained therein, and subjecting the resulting dichlorinated hydrocarbons to a temperature of from about 350° C. to about 550° C. to split off hydrochloric acid therefrom; substantially as described.

2. The method of producing a non-volatile unsaturated hydrocarbon oil, which comprises subjecting the dichlorinated derivatives of petroleum fractions having a boiling point above approximately 250° C. in the presence of a suitable catalyst to a temperature of from about 350° C. to about 500° C. and thereby splitting off hydrochloric acid from said chlorinated product; substantially as described.

3. The method of producing a non-volatile unsaturated hydrocarbon oil, which comprises subjecting the dichlorinated derivatives of petroleum fractions having a boiling point above approximately 250° C. in the presence of a suitable catalyst and *in vacuo* to a temperature of from about 350° C. to about 500° C. and thereby splitting off hydrochloric acid from said chlorinated product; substantially as described.

4. The method of producing a non-volatile unsaturated hydrocarbon oil, which comprises subjecting the dichlorinated derivatives of petroleum fractions having a boiling point above approximately 250° C. in the presence of a suitable catalyst and of diluting inert vapors to a temperature of from about 350° C. to about 500° C. and thereby splitting off hydrochloric acid from said chlorinated product; substantially as described.

5. The method of producing a non-volatile unsaturated hydrocarbon oil which comprises subjecting the dichlorinated derivatives of petroleum fractions having a boiling point above approximately 250° C. to a temperature of about 400° C. in the presence of barium chlorid as a catalyst, and thereby splitting off hydrochloric acid from such hydrocarbon product; substantially as described.

6. As a new composition of matter, a non-volatile unsaturated hydrocarbon oil, corresponding to petroleum fractions of a boiling point of above approximately 250° C., said product having valuable drying and film forming properties and being a valuable substitute for linseed oil.

7. As a new composition of matter, a non-volatile double-unsaturated hydrocarbon oil, corresponding to petroleum hydrocarbons having a boiling point above approximately 250° C., said product having an iodin number of from about 120 to 150, and valuable drying and film forming properties; substantially as described.

In testimony whereof we affix our signatures, in presence of two witnesses.

BENJAMIN T. BROOKS.
FRED W. PADGETT.

Witnesses for B. T. Brooks:
 DAVID B. DAY,
 RUSSELL J. BURT.

Witnesses for Fred W. Padgett:
 M. C. MOORE,
 C. H. HARBISON.